United States Patent [19]

Fujimura et al.

[11] Patent Number: 4,569,318
[45] Date of Patent: Feb. 11, 1986

[54] SECONDARY INTAKE AIR SUPPLY SYSTEM FOR INTERNAL COMBUSTION ENGINES

[75] Inventors: Akira Fujimura; Norio Tomobe, both of Saitama, Japan

[73] Assignee: Honda Giken Kogyo Kabushiki Kaisha, Tokyo, Japan

[21] Appl. No.: 635,255

[22] Filed: Jul. 27, 1984

[30] Foreign Application Priority Data

Jul. 27, 1983 [JP] Japan .................. 58-117589[U]

[51] Int. Cl.⁴ ........................................... F02M 23/04
[52] U.S. Cl. .................................... 123/327; 123/587; 123/589
[58] Field of Search ................... 123/585–589, 123/327

[56] References Cited

U.S. PATENT DOCUMENTS 4,083,341  4/1978  Brettschneider et al. .......... 123/589
4,091,783  5/1978  Laprade et al. ..................... 123/589
4,355,699  6/1982  Totsune et al. ..................... 123/587

FOREIGN PATENT DOCUMENTS 56-44413  4/1981  Japan ................................. 123/587

Primary Examiner—William A. Cuchlinski, Jr.
Attorney, Agent, or Firm—Lyon & Lyon

[57] ABSTRACT

A secondary intake air supply system for internal combustion engines having two vacuum operated air control valves in parallel in a single secondary air supply line to the intake manifold. One of the air control valves is controlled by a vacuum control valve to open and close gradually to avoid abrupt changes in the air fuel mixture to the engine, upon changes in vehicle operation. Electromagnetic valves operated by a control circuit responsive to both an exhaust gas sensor and a throttle position also control the secondary air supplied through the two air control valves.

8 Claims, 3 Drawing Figures

SECONDARY INTAKE AIR SUPPLY SYSTEM FOR INTERNAL COMBUSTION ENGINES

In internal combustion engines having a three-way catalytic converter in its exhaust system for purifying the exhaust gas, the air-fuel ratio is controlled in a feedback manner to the vicinity of a stoichiometric ratio in accordance with the concentration of the exhaust gas and the running state of the engine so that air-fuel ratio may be adjusted, because a three-way catalyzer acts most effectively when the air-fuel ratio of the intake mixture is in the vicinity of the stoichiometric ratio (e.g., 14.7:1). It is common to employ a secondary intake air supply system for the feedback control, in which that air-fuel ratio control is corrected by controlling a flow rate of the secondary air to flow through a secondary intake air passage communicating downstream of the throttle valve of a carburetor.

Normally, in the decelerating or idling state of an engine, the throttle valve is substantially fully closed and the load upon the engine is light. As a result, the compression pressure in the engine cylinder is lowered and the combustion state is unstable by reason of the increase in the ratio of the residual combustion gas to the fresh air in the combustion chamber. This makes it necessary to control the air-fuel ratio of the supply mixture to a richer state than the stoichiometric value which is accomplished by air-fuel ratio of the supply mixture in the aforementioned secondary intake air supply system being enriched by interrupting the feedback control to make an open loop of the control system.

When the internal combustion engine is mounted in a vehicle and the throttle valve is abruptly closed by releasing the accelerator pedal thereby causing the vehicle to decelerate while it is running, instantly a high vacuum is established downstream of the throttle valve so that a large quantity of fuel is sucked from a fuel metering device such as a carburetor. During the deceleration, therefore, the air suction rate is restricted by the throttle valve and becomes short so that the air-fuel ratio becomes overrich and the compression pressure in the cylinder drops. As a result, the combustion temperature drops to make the combustion state unstable so that the engine exhaust gases have high concentrations of noxious contents, especially, the unburned components, e.g., HC (i.e., hydrocarbons) and CO (i.e., carbon monoxide).

In order to prevent the overrich state immediately after the start of the deceleration, according to the prior art, there has been disposed in the engine intake system a vacuum responding type secondary intake air supply valve which is operative to supply secondary intake air downstream of the throttle valve only immediately after the start of the deceleration by making use of the fact that the vacuum downstream of the throttle valve rises abruptly.

Since, however, the secondary air passage of the secondary intake air supply system for the feedback control is shut off in the decelerating state in which the feedback control is interrupted, the secondary air supply valve for the deceleration cannot be disposed in the common secondary air passage of the secondary intake air supply system. In order that the decelerating secondary air supply valve may operate independently of the secondary intake air supply device for the feedback control, therefore, a decelerating secondary air passage other than the secondary air passage of the secondary intake air supply system for the feedback control is required but this raises a problem that the construction of the intake system becomes more complicated.

It is, therefore, an object of the present device to provide a secondary intake air supply system which prevents the noxious contents from being emitted in the exhaust gas immediately after the start of deceleration by supplying secondary air to the downstream of a throttle valve without complicating the construction of the intake system.

The secondary intake air supply system according to the present invention is characterized in that the effective area of the secondary intake air passage communicating downstream of the throttle valve of a carburetor is varied by an air control valve having its opening varied in accordance with the level of a fluid pressure in a pressure receiving chamber so that the pressure receiving chamber of said air control valve may be supplied in a normal running state with a first control pressure based upon the exhaust concentration and immediately after the start of a decelerating run with a second control pressure capable of opening the air control valve.

The present device will be described in connection with a preferred embodiment thereof shown in the accompanying drawings, wherein.

Figure 1:
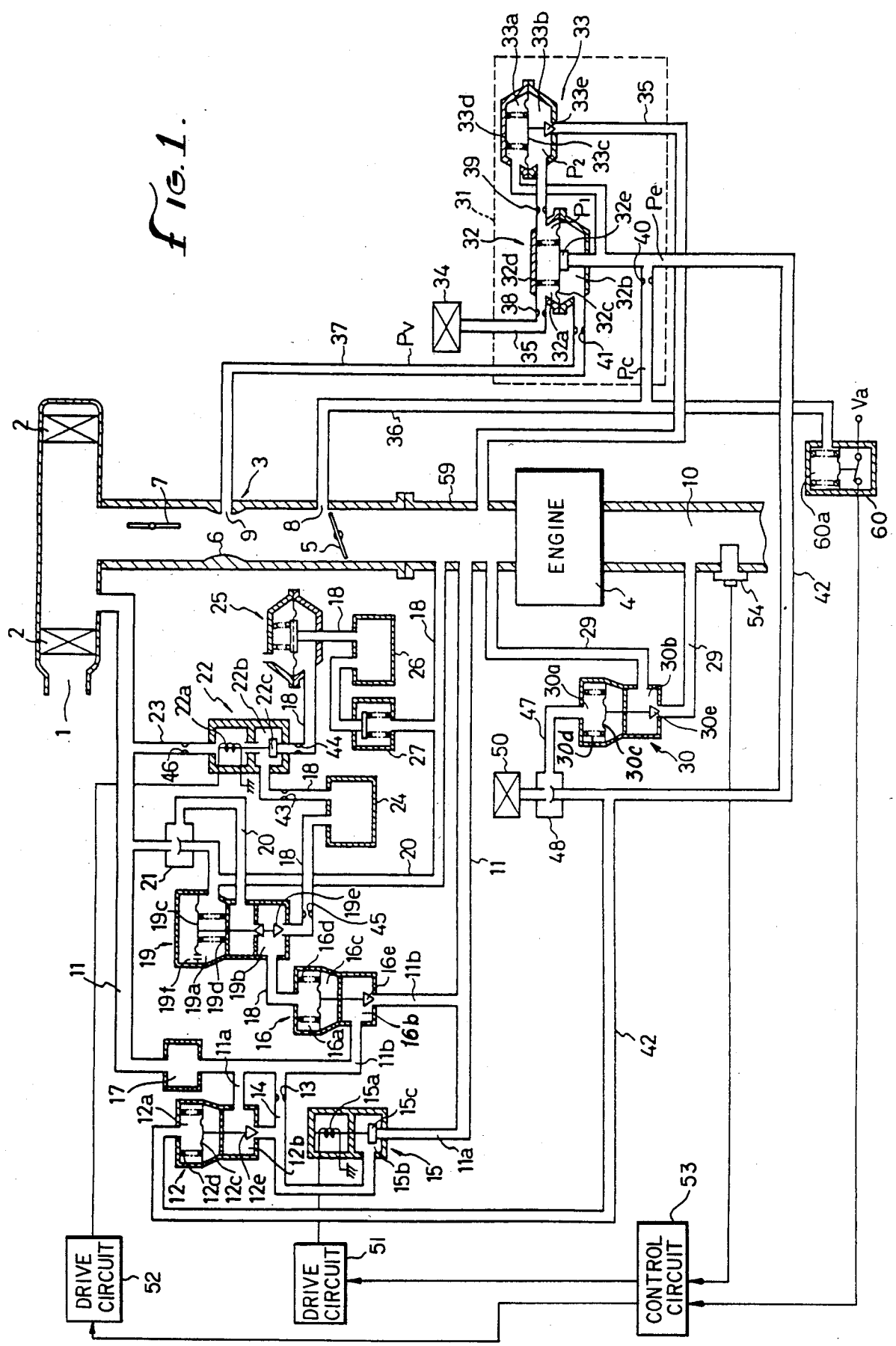
FIG. 1 is a diagram showing the preferred embodiment of the present invention.

In the secondary intake air supply system according to one embodiment of the present invention, as shown in FIG. 1, intake air is supplied from an air intake port 1 through an air cleaner 2 and a carburetor 3 to an engine 4. The carburetor 3 is equipped with a throttle valve 5, with a venturi 6 upstream of the throttle valve 5, and with a choke valve 7 upstream of the venturi 6. In the vicinity of the throttle valve 5, there is formed a vacuum detection port 8 which is located upstream of the throttle valve 5 when this valve 5 is closed, but downstream of the throttle valve 5 when this valve 5 is opened. Moreover, the venturi 6 is also provided with a vacuum detection port 9.

Communication between a point downstream of the throttle valve 5, i.e., in the intake manifold 59, and the vicinity of the air outlet from the air cleaner 2 is established by way of a secondary intake air passage 11. The secondary air passage 11 is formed with two air control branches 11a and 11b for dividing the secondary air. The air control branch 11a is provided with a first air control valve 12. This first air control valve 12 is composed of: a vacuum chamber 12a; a valve chamber 12b forming a part of the air control passage 11a; a diaphragm 12c forming a part of the vacuum chamber 12a; a valve spring 12d fitted in the vacuum chamber 12a; and a tapered valve member 12e fitted in the valve chamber 12b biased through the diaphragm 12c by the valve spring 12d to shut off the air control passage 11a. The effective area of the air control passage 11a is varied by valve member 12e in accordance with the level of the vacuum prevailing in the vacuum chamber 12a and, specifically, it is enlarged with the rise in the vacuum. In order to bypass the first air control valve 12, there is provided an air correcting passage 14 which is formed with an orifice 13 for correcting the idling. Moreover, the air control passage 11a is provided with an electromagnetic valve 15 downstream of the first air control valve 12. The electromagnetic valve 15 is composed of: a solenoid 15a; a valve chamber 15b forming a part of the air control passage 11a; and a valve member 15c fitted in the valve chamber 15b and magnetically coupled to the solenoid 15a. The valve 15 provides communication through the air control passage 11a only when the solenoid 15a is energized.

The vacuum prevailing in the vacuum chamber 12a of the first air control valve 12 is controlled by a vacuum control unit 31. The vacuum control unit 31 is constructed of a vacuum responsive type adjusting valve 32 and a pneumatic valve 33, which are respectively composed of vacuum chambers 32a and 33a, valve chambers 32b and 33b, diaphragms 32c and 33c, valve springs 32d and 33d, and valve members 32e and 33e. The vacuum chamber 32a is formed midway of an intake control passage 35 leading from an air vent hole 34 having a filter to a point downstream of the throttle valve 5. The valve chamber 33b is disposed in the intake control passage 35 downstream of the vacuum chamber 32a. The valve member 33e is so biased through the diaphragm 33c by the valve spring 33d as to shut off the intake control passage 35. The vacuum chamber 33a has communication with the vacuum detection port 8 via a vacuum passage 36, and the valve chamber 32b has communication with the vacuum detection port 9 via a vacuum passage 37. Moreover, the valve chamber 32b is adapted to communicate with the vacuum passage 36 upon opening of valve member 32e, and the valve spring 32d biases the valve member 32e through the diaphragm 32c in the direction so that the valve member 32e shuts off the passage leading from the valve chamber 32b to the vacuum passage 36. The intake control passage 35 is provided with orifices 38 and 39 respectively upstream and downstream of the vacuum chamber 32a. The vacuum passage 36 is provided with an orifice 40. The vacuum passage 37 is provided with an orifice 41.

The vacuum passage 36, at the sides of the valve chamber 32b and the vacuum chamber 33a from the orifice 40, communicates with the vacuum chamber 12a via a vacuum supply passage 42.

The air control passage 11b is provided with a second air control valve 16 which is constructed like the first air control valve 12 such that it is composed of a vacuum chamber 16a, a valve chamber 16b, a diaphragm 16c, a valve spring 16d and a tapered valve member 16e. The second air control valve 16 varies the effective area of the air control passage 11b in accordance with the level of the vacuum prevailing in the vacuum chamber 16a such that the effective area is increased with the rise in the vacuum. The secondary intake air passage 11 is provided with a silencer 17 between the air filter 2 and the two air control valves 12 and 16.

The vacuum chamber 16a communicates with a point downstream of the throttle valve 5 via a vacuum supply passage 18. This vacuum supply passage 18 is provided with a vacuum control valve 19. This vacuum control valve 19 is composed of: a vacuum chamber 19a; a valve chamber 19b forming a part of the vacuum supply passage 18 and adapted to communicate downstream of the throttle valve 5 via a vacuum supply passage 20; a diaphragm 19c dividing the inside of the vacuum chamber 19a into first and second compartments; a valve spring 19d fitted in the vacuum chamber 19a; a valve member 19e fitted in the valve chamber 19b and biased through the diaphragm 19c by the valve spring 19d to shut off the vacuum supply passage 20; and an orifice 19f formed in the diaphragm 19c. The first compartment of the vacuum chamber 19a is supplied via the vacuum supply passage 20 with a vacuum $P_B$, downstream of the throttle valve 5 so that the valve member 19e shuts off the vacuum supply passage 18, in case the pressure difference between the first and second compartments exceeds a predetermined level, to establish communication between the vacuum supply passage 20 and the vacuum supply passage 18 at the side of the vacuum chamber 16a from the vacuum control valve 19 via the valve chamber 19b. The vacuum supply passage 20 is provided with a temperature sensing valve 21, which shuts off the vacuum supply passage 20, when the engine cooling water has a temperature lower than a predetermined level $t_1$. (e.g., 50° C.), to supply the valve chamber 19b with the atmospheric pressure.

Moreover, the vacuum supply passage 18 is provided with an electromagnetic valve 22 in a position closer to the point of connection to the manifold downstream of the throttle valve 5 than the vacuum control valve 19. The electromagnetic valve 22 is composed of: a solenoid 22a; a valve chamber 22b forming a part of the vacuum supply passage 18; and a valve member 22c fitted in the valve chamber 22b and magnetically coupled to the solenoid 22a. The valve chamber 22b is vented to the atmosphere via an atmosphere supply passage 23 to shut off the vacuum supply passage 18 and establish the communication between the vacuum supply passage 18 at the side of the valve chamber 19b from electromagnetic valve 22 and the atmosphere supply passage 23 via the valve chamber 22b when the solenoid 22a is deenergized. The vacuum supply passage 18 closer to the valve chamber 19b than the electromagnetic valve 22 is provided with a surge tank 24, and the vacuum supply passage 18 closer to the connection point downstream of the throttle valve 5 than the electromagnetic valve 22 is provided with a constant vacuum control valve 25, a storage tank 26 and a check valve 27 in the recited order toward the point downstream of the throttle valve 5. The constant vacuum control valve 25 is used to stabilize the vacuum $P_B$, generated downstream of the throttle valve 5 to a vacuum $P_r$ of a predetermined level when the vacuum $P_B$ is equal to or higher than that predetermined level. The check valve 27 allows the passage of the fluid flow only in the direction toward the connection downstream of the throttle valve 5. The vacuum supply passage 18 is equipped with orifices 43 and 44 at both the sides of the electromagnetic valve 22 and with an orifice 45 between the surge tank 24 and the vacuum control valve 19. Moreover, the atmosphere supply passage 23 is also provided with an orifice 46.

Communication between the inside of the intake manifold 59 and the exhaust passage 10 is provided by way of an exhaust gas recirculation passage 29. This EGR passage 29 is provided with an exhaust gas recirculation control valve 30. This EGR control valve 30 is constructed like the first and second air control valves 12 and 16 such that it is composed of a vacuum chamber 30a, a valve chamber 30b, a diaphragm 30c, a valve spring 30d and a tapered valve member 30e. The EGR control valve 30 thus constructed varies the effective area of the EGR passage 29 in accordance with the vacuum prevailing in the vacuum chamber 30a so that the effective area is enlarged in accordance with the rise of the vacuum. The vacuum chamber 30a has communication with the vacuum control unit 31 via a vacuum supply passage 47 which is branched from the vacuum supply passage 42 and which is provided with a temperature sensing valve 48. This temperature sensing valve 48 shuts off the vacuum supply passage 47 at the side of the vacuum supply passage 42 and provides the communication of the vacuum supply passage 47 at the side of the vacuum chamber 30a with an air vent hole 50 having a filter, when the temperature of the engine cooling water is below a predetermined level $t_2$ (e.g., 55° C.), so that the exhaust gas recirculation is effected only when the engine cooling water is higher than the predetermined temperature $t_2$.

The solenoids 15a and 22a are connected via drive circuits 51 or 52, respectively, to a control circuit 53, which is connected to an oxygen concentration sensor 54 disposed in the exhaust passage 10 of the engine 4. The oxygen concentration sensor 54 generates a voltage $V_{O2}$ at a level corresponding to the oxygen concentration in the engine exhaust gas so that the output voltage $V_{O2}$ rises in accordance with the increase in the richness of the exhaust gas. In order to detect the open position of the throttle valve 5 from the level of the vacuum in the vacuum detection port 8, there is provided a vacuum switch 60 which has its pressure receiving chamber 60a communicating with the vacuum passage 36. The vacuum switch 60 is turned on when the level of a vacuum $P_c$ supplied from the vacuum detection port 8 is lower than a predetermined pressure (e.g., 30 mmHg), to feed a high level signal at a voltage $V_a$ corresponding to a logical value "1" to the control circuit 53.

Figure 2:
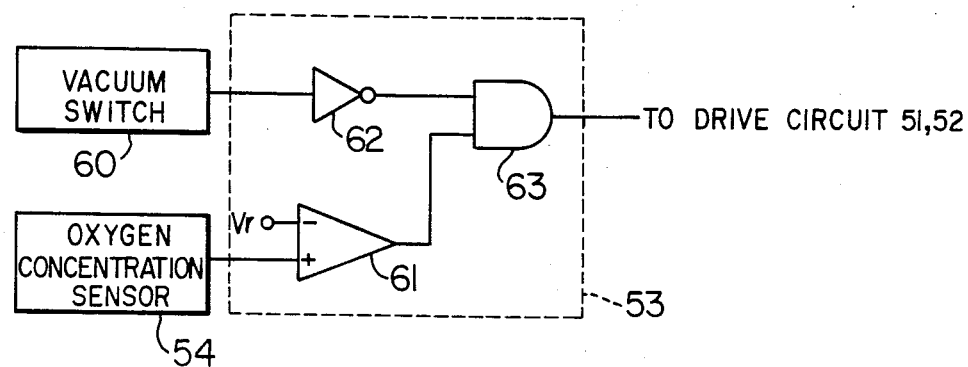
FIG. 2 is a block diagram showing the control circuit for the system of FIG. 1.

The control circuit 53 is composed, as shown in FIG. 2, of: a comparator 61 for comparing the output voltage $V_{O2}$ of the oxygen concentration sensor 54 with a predetermined voltage $V_r$; an inverter 62 connected with the output terminal of the vacuum switch 60; and an AND circuit 63 for taking a logical "AND" between the output level of the comparator 61 and the output level of the inverter 62.

In the secondary intake air supply system thus constructed according to the present device, the operations of the vacuum control unit 31 will be first described.

The vacuum $P_c$ is introduced from the vacuum detection port 8 via the vacuum passage 36 into the vacuum chamber 33a by the operation of the engine 4 and the valve member 33e is moved in an opening direction when the vacuum $P_c$ is stronger than the biasing force by the valve spring 33d. When the pneumatic valve 33 is opened, the atmospheric air is rapidly introduced into the intake manifold 59 downstream of the throttle valve 5 from the air vent hole 34 via the intake control passage 35. The vacuums $P_1$ and $P_2$ of the vacuum chamber 32a and the valve chamber 33b, respectively, through which that atmosphere passes, are determined by the aperture ratios of the orifices 38 and 39.

Next, when the pressure difference between the vacuum $P_v$, introduced from the vacuum detection port 9 into the valve chamber 32b and the vacuum pressure $P_1$ is stronger than the biasing force by the valve spring 32d, the valve member 32e is moved toward an opening direction. The vacuum $P_c$ that passed through the orifice 40 is diluted as a result of the adjusting valve 32 being opened by the vacuum $P_v$, into a new value of vacuum on vacuum chamber 33a of vacuum $P_e$.

Next, the opening of the pneumatic valve 33 is decreased as a result of the reduction in the vacuum thereon to $P_e$ so that the flow rate of the air through the intake control passage 35 is also decreased. With this decrease in the air flow rate, the vacuum $P_1$ in the vacuum chamber 32a drops so that the adjusting valve 32 moves into its closed state. Then, the vacuum $P_e$ again rises so that the operations thus far described are repeated. Since these repetitions are effected at a high rate, the pressure ratio between the vacuums $P_v$ and $P_e$ becomes equal to that between the vacuums $P_1$ and $P_2$.

When the primary suction rate of the engine 4 is low, the vacuum $P_1$ is higher than the vacuum $P_v$, so that the adjusting valve 32 has its opening enlarged to drop the vacuum $P_e$. In accordance with the increase in the primary suction rate, the vacuum $P_v$ is increased so that the adjusting valve 32 has its opening decreased to raise the vacuum $P_e$. The vacuum $P_e$ is introduced into not only the vacuum chamber 33a but also the vacuum chamber 12a of the first air control valve 12 to open the pneumatic valve 33 and the first air control valve 12 whereby the rate of the air flow through the intake control passage 35 and the secondary air flow rate through the air control branch 11a when the electromagnetic valve 15 is opened are proportional to each other and the primary air flow rate to the engine 4 and the secondary air flow rate through the air control branch 11a when the electromagnetic valve 15 is opened are proportional to each other. As a result, the vacuum $P_e$ takes a level proportional to the flow rate of the primary air.

Next, in the control circuit 53, when the output voltage $V_{O2}$ of the oxygen concentration sensor 54 is higher than the predetermined voltage $V_r$ (i.e., $V_{O2} \geq V_r$, the air-fuel ratio is rich so that the output level of the comparator 61 becomes high. In case the output voltage $V_{O2}$ is lower than the predetermined voltage $V_r$ (i.e., $V_{O2} < V_r$), the air-fuel ratio is lean so that the output of the comparator 61 takes a low level. When the air-fuel ratio feedback control operates with the throttle valve 5 being opened, the vacuum $P_c$ is introduced into the pressure receiving chamber 60a so that the vacuum switch 60 is turned off. As a result, the supply level from the vacuum switch 60 to the inverter 62 is low so that the output level of the inverter 62 becomes high. Thus, the output level of the AND circuit 63 becomes equal to the output level change of the comparator 61. In case it is judged from the output level of the oxygen concentration sensor 54 that the air-fuel ratio is rich, the output level of the AND circuit 63 becomes high, and this high level is fed as a richness signal to the drive circuits 51 and 52. In case it is judged that the air-fuel ratio is lean, on the other hand, the output level of the AND circuit 63 becomes low, and this low level is fed as a leanness signal to the drive circuits 51 and 52.

These drive circuits 51 and 52 render the electromagnetic valve 15 and 22 inoperative by deenergizing the solenoids 15a and 22a in response to the leanness signal and the same operative by energizing the solenoids 15a and 22a in response to the richness signal. First, while the electromagnetic valves 15 and 22 are inoperative, the valve 15 shuts off the air control passage 11a and the valve 22 shuts off the vacuum supply passage 18 and establishes the communication between the vacuum supply passage 18 at the side of the vacuum chamber 16a from the electromagnetic valve 22 and the atmosphere supply passage 23. The vacuum in the vacuum chamber 16a gradually drops so that the valve member 16e of the second air control valve 16 is moved in a closing direction to shut off the air control branch 11b. While the air control branches 11a and 11b are closed, the secondary air is not supplied from the secondary air passage 11 to the engine 4 so that the air-fuel ratio of the mixture is controlled to a richer side. Next, when the electromagnetic valves 15 and 22 are switched from their inoperative states to their operative states, the valve 15 is promptly opened so that the secondary air flows through the air control branch 11a at a flow rate corresponding to the opening of the first air control valve 12, i.e., at a rate proportional to that of the primary air. On the other hand, the electromagnetic valve 22 establishes the communication of the vacuum supply passage 18 but shuts off the passage to the atmosphere supply passage 23 so that the vacuum $P_r$ is supplied to the vacuum chamber 16a. As a result, the pressure in the vacuum chamber 16a gradually approaches the vacuum $P_r$ so that the second air control valve 16 is opened to start the passage of the secondary air through the air control branch 11b. As the vacuum in the vacuum chamber 16a approaches the vacuum $P_r$, the opening of the second air control valve 16, i.e., the effective area of the air control passage is gradually increased to augment the flow rate of the secondary air. As a result, the secondary air through the air control branches 11a and 11b is additionally supplied to the engine 4 via the secondary air passage 11 so that the air-fuel ratio of the mixture is controlled to a leaner condition, whereby the flow rate of the secondary air to be supplied to the engine 4 is increased with the time. When the electromagnetic valves 15 and 22 are then switched from their operative states to their inoperative states, the air control branch 11a is shut off at the instant when the valve 15 is closed and the valve 22 shuts off the vacuum supply passage 18 and establishes the communication between the vacuum supply passage 18 at the side of the vacuum chamber 16a from the electromagnetic valve 22 and the atmosphere supply passage 23, as has been described in the above, so that the vacuum chamber 16a is supplied with the atmospheric pressure to have its pressure gradually approaching the atmospheric level, whereby the effective area of the air control branch 11b is gradually decreased to reduce the flow rate of the secondary air. Thus, even if the air control branch 11a is shut off, the secondary air is supplied to the engine 4 via the air control branch 11b and the secondary air passage 11, and its flow rate drops with the elapse of time.

Figure 3:
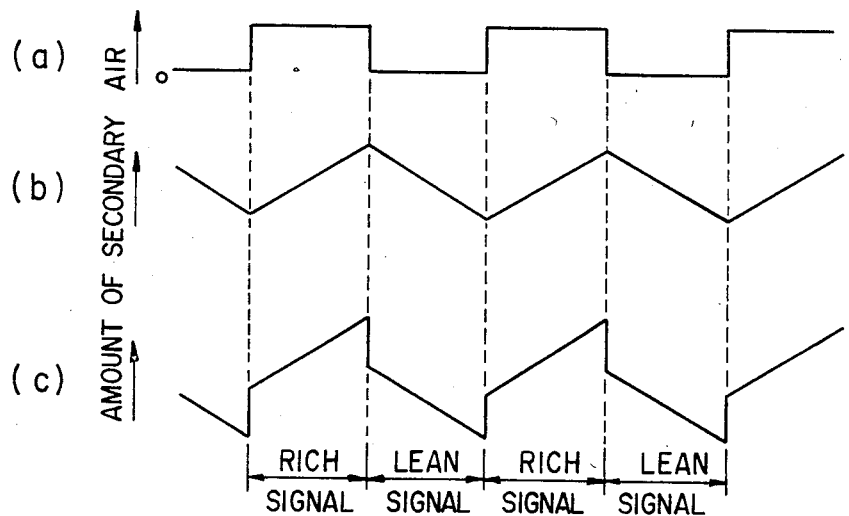
FIG. 3 is a waveform chart showing the operations of the system of FIG. 1.

If the air-fuel ratio is controlled to a set value, the richness signal and the leanness signal are generated alternately and continuously so that the secondary air flows intermittently in the air control branch 11a, as is shown by line (a) in FIG. 3, whereby the flow rate of the secondary air is proportionally controlled. In the air control branch 11b, on the other hand, the flow rate of the secondary air is gradually increased in the presence of the richness signal and is gradually decreased in the presence of a leanness signal, as shown by line (b) in FIG. 3, so that it is subjected to an integral control. As a result, the flow rate of a secondary air through the secondary air passage 11 is the addition of that proportionally controlled air and that integrally controlled air as shown by line (c) in FIG. 3.

Next, the operations of the secondary intake air supply system according to the present device in the decelerating state of the engine will be described in the following.

For example, if a driver of an automobile running on a flat road releases the accelerator pedal, the engine comes into its decelerating state. At the time of deceleration, the level of the vacuum $P_c$ introduced from the vacuum detection port 8 into the vacuum switch 60, as a result of the throttle valve 5 being closed, is lower than a predetermined pressure so that the vacuum switch 60 is turned on to feed a high level signal to the inverter 62, and the output level of this inverter 62 becomes low. As a result, the AND circuit 63 feeds the low level to the drive circuits 51 and 52 irrespective of the output level of the comparator 61, i.e., the level sensed by the oxygen concentration sensor 54. The drive circuits 51 and 52 interrupt the drives of the electromagnetic valves 15 and 22, like the case in which they are fed with the leanness signal, so that the electromagnetic valves 15 and 22 are rendered inoperative (i.e., closed) to thereby interrupt the feedback control of the air-fuel ratio.

When the throttle valve 5 is abruptly closed by releasing the accelerator pedal thereby causing deceleration, the vacuum $P_B$ downstream of the throttle valve 5 is instantly changed to a high vacuum, which is introduced into the first compartment of the vacuum chamber 19a of the vacuum control valve 19. As a result, the valve member 19e of the vacuum control valve 19 shuts off the vacuum supply passage 18 at the side of the electromagnetic valve 22 but establishes the communication between the vacuum supply passage 18 at the side of the vacuum chamber 16a and the vacuum supply passage 20 so that the intake vacuum $P_B$ is introduced into the vacuum chamber 16a to open the second air control valve 16. As a result, the air control branch 11a is shut off, but the air control branch 11b retains its communicating state to supply the secondary air therethrough to the point downstream of the throttle valve 5 so that the air-fuel ratio of the supply mixture is controlled to a leaner side.

Thereafter, the vacuum $P_B$ in the first compartment of the vacuum chamber 19a leaks into the second compartment to reduce the pressure difference between the first and second compartments so that the vacuum control valve 19 interrupts the communication between the vacuum supply passage 18 at the side of the vacuum chamber 16a and the vacuum supply passage 20 but establishes the communication of the vacuum supply passage 18 at both sides of the vacuum chamber 16a and the electromagnetic valve 22. As a result, the vacuum chamber 16a is supplied with the atmospheric pressure from the electromagnetic valve 22 via the valve chamber 19b so that the second air control valve 16 is closed to shut off the air control branch 11b. As a result, the supply of the secondary air to the point downstream of the throttle valve 5 is substantially interrupted so that the air-fuel ratio of the supply mixture is controlled to a richer side until it takes a richer value than the stoichiometric value.

Next, when the engine is switched from its decelerating state to its accelerating state, the throttle valve 5 is opened by depressing the accelerator pedal. As a result, the level of the vacuum $P_c$ in the vacuum detection port 8 exceeds a predetermined level to turn off the vacuum switch 60 so that the output level from the vacuum switch 60 to the inverter 62 is inverted from the high level to the low level. As a result, the output level of the AND circuit 63 becomes equal to the output level change of the comparator 61 so that the secondary air is supplied in accordance with the output level of the oxygen concentration sensor 54 to restart the feedback control of the air-fuel ratio.

While the engine 4 is in a cold running condition, its combustion is unstable. If the secondary air is supplied during deceleration in that unstable state, an engine stall may be caused by the abrupt change in the air-fuel ratio. In the cold running condition of the engine 4, however, the vacuum downstream of the throttle valve 5 is abruptly raised so that the vacuum control valve 19 is actuated in accordance with the raised vacuum to establish communication from the vacuum supply passage 18 to the vacuum chamber 16a and from the vacuum supply passage 20 through the valve chamber 19b. If, at this time, a high vacuum is supplied from the vacuum supply passage 20, the second air control valve 16 is opened to supply the secondary air to the point downstream of the throttle valve 5 via the air control branch 11b. Since the engine temperature at this time is low, however, the vacuum supply passage 20 to the valve chamber 19b is vented to the atmosphere through the temperature sensing valve 21 so that the second air control valve 16 has its vacuum chamber 16a supplied with atmospheric pressure to urge the valve into its closed state. As a result, the supply of the secondary air is interrupted to prevent the engine stall.

Thus, in the secondary intake air supply system according to the present device, the air control valve for varying the effective area of the secondary intake air passage has its pressure receiving chamber supplied in the normal running state with the first control pressure for controlling the air-fuel ratio on the basis of the exhaust gas concentration and supplied only immediately after the start of deceleration of the engine with the second control pressure capable of opening the air control valve by interrupting the supply of the first control pressure. As a result, the secondary air immediately after the start of the deceleration and the secondary air in the normal running state are supplied to downstream of the throttle valve via the common secondary intake air passage. Consequently, the construction of the intake system can be simplified more than that of the prior art so that the production cost can be reduced. Moreover, the secondary air is supplied immediately after the start of deceleration of the engine to downstream of the throttle valve via the secondary intake air passage so that the air-fuel ratio can be prevented from becoming overrich in the subsequent decelerating state.

The invention claimed is:

1. A secondary intake air supply system having an air control valve disposed in a secondary intake air passage, which has communication with a point downstream of the throttle valve of the carburetor of an internal combustion engine, for having its opening varied in accordance with the magnitude of a fluid pressure in a pressure receiving chamber to vary the effective area of said secondary intake air passage, and having means for judging an air-fuel ratio from the concentration of the exhaust gas of the engine and generating a signal with first control pressure generating means responsive to that signal for supplying a first control pressure to the pressure receiving chamber, the improvement comprising, a second control pressure generating source for generating a second control pressure capable of opening said air control valve, and means for interrupting the supply of said first control pressure to said pressure receiving chamber and supplying said second control pressure to said pressure receiving chamber only immediately after the start of the deceleration of said engine.

2. A secondary intake air supply system as set forth in claim 1, wherein pressure supply interrupting means includes a vacuum-responsive type fluid pressure control valve for interrupting the supply of said first control pressure to said pressure receiving chamber and supplying said second control pressure to said pressure receiving chamber in case the level of the vacuum downstream of said throttle valve exceeds a predetermined value.

3. A secondary intake air supply system as set forth in claim 1, wherein said second control pressure generating source is the vacuum downstream of said throttle valve.

4. A secondary intake air supply system for an internal combustion engine, comprising, a secondary intake air passage, a pair of air control valves mounted in parallel in said passage, and means for controlling one of said valves to gradually open and close said valve upon changes in engine operation requiring additional or less secondary air including means directly responsive to an abrupt increase in the intake vacuum on the engine to cause rapid opening followed by gradual closing of said one air control valve.

5. The secondary intake air supply system of claim 4 wherein means are provided for responding to the closing of the engine throttle valve to initiate the gradual closing of said one air control valve and to immediately close the other air control valve.

6. In a secondary intake air supply system for an internal combustion engine wherein a secondary intake air passage has a pair of air control valves positioned in parallel and operable by vacuum pressures thereon, comprising a vacuum pressure control valve connected to one of said air control valves for controlling the operating vacuum pressure thereon, said vacuum pressure control valve having valve element means for gradually varying the control pressure to said one air control valve between a supply of atmospheric air pressure and the vacuum pressure on the intake manifold of the engine.

7. The secondary air supply system of claim 6 wherein said vacuum pressure control valve has a pressure chamber for causing operation of said valve element means, and means connecting said pressure chamber directly to the engine intake manifold to impose a vacuum thereon to cause movement of said valve element means to a position to supply atmospheric air pressure to said control valve to close same.

8. The secondary air supply system of claim 7 wherein said vacuum pressure control valve is provided with means for responding to only abrupt increases in said engine intake manifold vacuum pressure.

* * * * *